United States Patent
Hong et al.

(10) Patent No.: US 10,764,326 B2
(45) Date of Patent: Sep. 1, 2020

(54) CAN CONTROLLER SAFE AGAINST CAN-COMMUNICATION-BASED HACKING ATTACK

(71) Applicant: Fescaro Co., Ltd., Daejeon (KR)

(72) Inventors: Seok Min Hong, Daejeon (KR); Hyun Jeong Lee, Gyeonggi-do (KR); Geun Chul Kang, Gyeonggi-do (KR)

(73) Assignee: FESCARO CO., LTD., Daejeon (KR)

( * ) Notice: Subject to any disclaimer, the term of this patent is extended or adjusted under 35 U.S.C. 154(b) by 0 days.

(21) Appl. No.: 16/380,072

(22) Filed: Apr. 10, 2019

(65) Prior Publication Data

US 2019/0238586 A1 Aug. 1, 2019

Related U.S. Application Data

(63) Continuation of application No. PCT/KR2016/013870, filed on Nov. 29, 2016.

(30) Foreign Application Priority Data

Oct. 10, 2016 (KR) .................. 10-2016-0130696

(51) Int. Cl.
*H04L 29/06* (2006.01)
*H04L 12/40* (2006.01)
(Continued)

(52) U.S. Cl.
CPC ........ *H04L 63/1466* (2013.01); *G06F 3/0623* (2013.01); *G06F 3/0634* (2013.01);
(Continued)

(58) Field of Classification Search
None
See application file for complete search history.

(56) References Cited

U.S. PATENT DOCUMENTS

| | | | | |
|---|---|---|---|---|
| 2015/0343967 A1* | 12/2015 | Jeon | ...................... | B60R 16/023 |
| | | | | 713/184 |
| 2016/0021127 A1* | 1/2016 | Yan | ...................... | G06F 21/554 |
| | | | | 726/23 |
| 2019/0260799 A1* | 8/2019 | Chen | ...................... | G06F 21/57 |

FOREIGN PATENT DOCUMENTS

| | | |
|---|---|---|
| JP | 3661946 B2 | 6/2005 |
| JP | 2013-046304 A | 3/2013 |

(Continued)

*Primary Examiner* — Joseph P Hirl
*Assistant Examiner* — Hassan Saadoun
(74) *Attorney, Agent, or Firm* — Burris Law, PLLC

(57) ABSTRACT

A CAN controller safe against a CAN-communication-based hacking attack includes each CAN controller that filters a message to be transmitted to a CAN bus. A corresponding CAN controller filters only a message having a valid transmission ID to be transmitted. The CAN controller safe includes a transmission buffer, a transmission filter unit, a protection memory and a filter value setting unit. The transmission buffer unit temporarily stores transmission data to be transmitted to a CAN bus. The transmission filter unit has message IDs allowed to be transmitted as a transmission filter, configured to search for a message ID of the transmission data in the transmission filter, and filter the transmission data. The protection memory stores one or more filter values of the transmission filter and the filter value setting unit is configured to fetch the filter value stored in the protection memory.

8 Claims, 7 Drawing Sheets

(51) Int. Cl.
*G06F 3/06* (2006.01)
*H04L 12/417* (2006.01)

(52) U.S. Cl.
CPC ............ *G06F 3/0679* (2013.01); *H04L 12/40* (2013.01); *H04L 12/40104* (2013.01); *H04L 12/417* (2013.01); *H04L 63/1408* (2013.01); *H04L 63/1416* (2013.01); *H04L 2012/40215* (2013.01)

(56) References Cited

FOREIGN PATENT DOCUMENTS

| | | |
|---|---|---|
| JP | 2013-048374 A | 3/2013 |
| JP | 2016-020185 A | 2/2016 |
| KR | 10-2015-0137599 A | 12/2015 |

\* cited by examiner

CAN CONTROLLER SAFE AGAINST CAN-COMMUNICATION-BASED HACKING ATTACK

RELATED APPLICATIONS

The present application is a continuation of PCT Application No. PCT/KR2016/013870 filed Nov. 29, 2016, which claims priority to Korean Patent Application No. 10-2016-0130696, filed Oct. 10, 2016, all of which are hereby incorporated in their entirety by reference as set forth herein.

TECHNICAL FIELD

The present disclosure relates to a CAN controller safe against a CAN-communication-based hacking attack in which each CAN controller filters a message transmitted to a CAN bus but a corresponding CAN controller filters only a message having a valid transmission ID to be transmitted.

Further, the present disclosure relates to a CAN controller safe against a CAN-communication-based hacking attack in which each CAN controller filters and receives a message broadcasted to a CAN bus but it checks a transmission period of the message to block or warn a message that does not match the transmission period.

TECHNICAL BACKGROUND

In general, according to the remarkable development of electronic control technology, various devices operating by using a mechanical method in a vehicle are driven by using an electric method for convenience of drivers and safety of operation, and a vehicle system is gradually enhanced and advanced. In particular, as the vehicle system is fully automated, communication between controllers inside a vehicle is also frequently performed. Controller area network (CAN) communication is generally used for communication inside the vehicle.

That is, an electronic control system inside the vehicle includes dozens of electronic control units such as an engine controller, a transmission controller, a brake controller, an airbag controller, etc. Also, each electronic controller includes a CAN controller for CAN communication, and communication between these electronic controllers uses CAN communication.

Basically, according to controller area network (CAN) protocol-based message communication, a network includes a plurality of nodes (or CAN controllers) and a common CAN bus. Each node transmits a message in a broadcast manner, and selects and receives a necessary message. That is, all CAN controllers (or nodes) transmit and receive messages using the common CAN bus. Also, each CAN controller (or node) transmits messages to be transmitted to all nodes on the network in a broadcast manner and provides its own arbitration function by a message identifier. Specifically, each node or CAN controller recognizes the message identifier, and filters and receives only a necessary message among broadcasted messages. That is, in CAN communication, there is no field capable of authenticating a transmission destination of a message in a data frame of the message.

However, as described above, since controller area network (CAN) communication performs transmission and reception using only the broadcasting method and the message identifier, there is a security risk inherent in a CAN protocol.

For example, since CAN communication transmits a message in a broadcast manner, when a malicious node is added to a CAN communication network, the malicious node may collect all the messages transmitted by other nodes. The malicious node may then use collected information to generate a fake message and transmit the fake message to the CAN communication network. Since there is no separate field for authenticating the transmissions destination in a data frame of a CAN communication message, the above-described spoofing attack is easily possible.

Also, when the arbitration function by the CAN message identifier is abused, a service denial attack is also easily possible. The arbitration function by an identifier is a function of assigning priorities to the respective identifiers and preferentially transmitting a message to which a priority has been assigned. An attacker (or the malicious node) collects messages on the CAN communication network and finds an identifier (ID) with the highest priority. Then, the attacker creates a fake message using the identifier and continuously transmits the message on the network. Because the fake message by the attacker has a high priority, other normal messages are not transmitted due to the arbitration function by the CAN message identifier. When this state continues, only a message of the attacker remains in the CAN communication network, resulting in a service denial situation where other normal messages are not be delivered.

In particular, in a vehicle electronic control system based on conventional CAN communication, high security vulnerability devices and security critical devices are connected to the same CAN bus. Therefore, there is a problem in that when high security vulnerability devices (telematics, AVN systems, etc.) are occupied by hackers due to a high connectivity to an external network, security critical devices (engine controllers, brake controllers, airbag controllers, etc.) are stolen, which may be an important security threat to the vehicle system.

In order to solve the above problem, there is proposed a technique of transmitting and receiving a message by exchanging encryption keys and encrypting the message only within a time window that is shared with each other [Patent Document 1]. Also, there is proposed a technique of transmitting and receiving a message by generating a secret key stream and encrypting the message using a symmetric key method [Patent Documents 2 and 3]. Also, there is proposed a technique of providing one-time password (OTP) ROM for generating an encryption key (Patent Document 4). There is proposed a technique of determining a hacking message using the periodicity of a message in CAN communication [Patent Document 5].

However, since the above prior art encrypts and transmits messages, there is a problem in that an operation for encrypting or decrypting messages must be performed, and an encryption key or a secret key must be generated or exchanged for encryption communication. Because a computation time is required for such an encryption operation, there is a problem in that transmission and reception time of messages may be delayed.

SUMMARY

Provided is a CAN controller safe against a CAN-communication-based hacking attack in which each CAN controller filters a message transmitted to a CAN bus but a corresponding CAN controller filters only a message having a valid transmission ID to be transmitted.

Provided is also a CAN controller safe against a CAN-communication-based hacking attack in which each CAN controller filters and receives a message broadcasted to a CAN bus but checks a transmission period of the message to block a message or provide a warning message that does not match the transmission period.

According to an aspect of the present disclosure, a CAN controller safe against a CAN-communication-based hacking attack includes a transmission buffer unit temporarily storing transmission data to be transmitted to a CAN bus; a transmission filter unit having message IDs allowed to be transmitted as a transmission filter, configured to search for a message ID of the transmission data in the transmission filter, and filter the transmission data; a protection memory storing one or more filter values of the transmission filter; and a filter value setting unit configured to fetch the filter value stored in the protection memory to set the one or more filter values of the transmission filter of the transmission filter unit.

According to another aspect of the present disclosure, a CAN controller safe against a CAN-communication-based hacking attack includes: a transmission buffer unit temporarily storing transmission data to be transmitted to a CAN bus; a transmission filter unit having message IDs allowed to be transmitted as a transmission filter, configured to search for a message ID of the transmission data in the transmission filter, and filter the transmission data; a reception filter unit having message IDs allowed to be received as a reception filter, configured to search for a message ID of reception data received by the CAN bus in the reception filter, and filter the reception data; a protection memory storing one or more filter values of the transmission filter and one or more filter values of the reception filter; and a filter value setting unit configured to fetch the filter value stored in the protection memory to set the one or more filter values of the transmission filter of the transmission filter unit or the one or more filter values of the reception filter.

The protection memory or a protection area of the protection memory may not change or delete one or more filter values stored by the CAN controller of a controller or a microcontroller.

The filter value setting unit may be set to a protection mode and a test mode, the filter value of the transmission filter may be set as one or more filter values stored in the protection memory in the protection mode, and the one or more filter values of the transmission filter may be set by the CAN controller of a controller or a microcontroller in the test mode.

The CAN controller safe against the CAN-communication-based hacking attack may further include a reception time inserter configured to insert a reception time into the reception data, wherein the reception filter unit determines whether the reception data is malicious by comparing a difference of reception times of most recently received at least three reception data having the same message ID with a period of the corresponding message ID.

When a difference between a first reception time and a third reception time among the most recently received at least three reception data is smaller than the period of the corresponding message ID, the reception filter unit may determine at least one reception data of the at least three reception data as a malicious message.

The protection memory may be read only memory (ROM) or a non-volatile memory of a flash memory.

As described above, according to a CAN controller safe against a CAN-communication-based hacking attack according to the present disclosure, an electronic control unit (ECU) connected to a CAN bus of a vehicle may detect or block an attack (malicious) message among CAN messages received from the CAN bus.

Also, according to the CAN controller safe against the CAN-communication-based hacking attack according to the present disclosure, an electronic control unit (ECU) of which control authority is stolen by a hacker may be prevented from being abused as a tool of a hacking attack that transmits the attack (malicious) message to the CAN bus of the vehicle. In particular, unknown types of received attack messages as well as known attack methods may be detected or blocked.

Also, according to the CAN controller safe against the CAN-communication-based hacking attack according to the present disclosure, the electronic control unit (ECU) connected to the CAN bus directly includes a detection and blocking system, thereby providing a safe CAN communication environment embedded in a semiconductor form, and thus applied to the existing vehicle internal network without any modification in accordance with the vehicle communication international standard.

DETAILED DESCRIPTION

Figure 1:
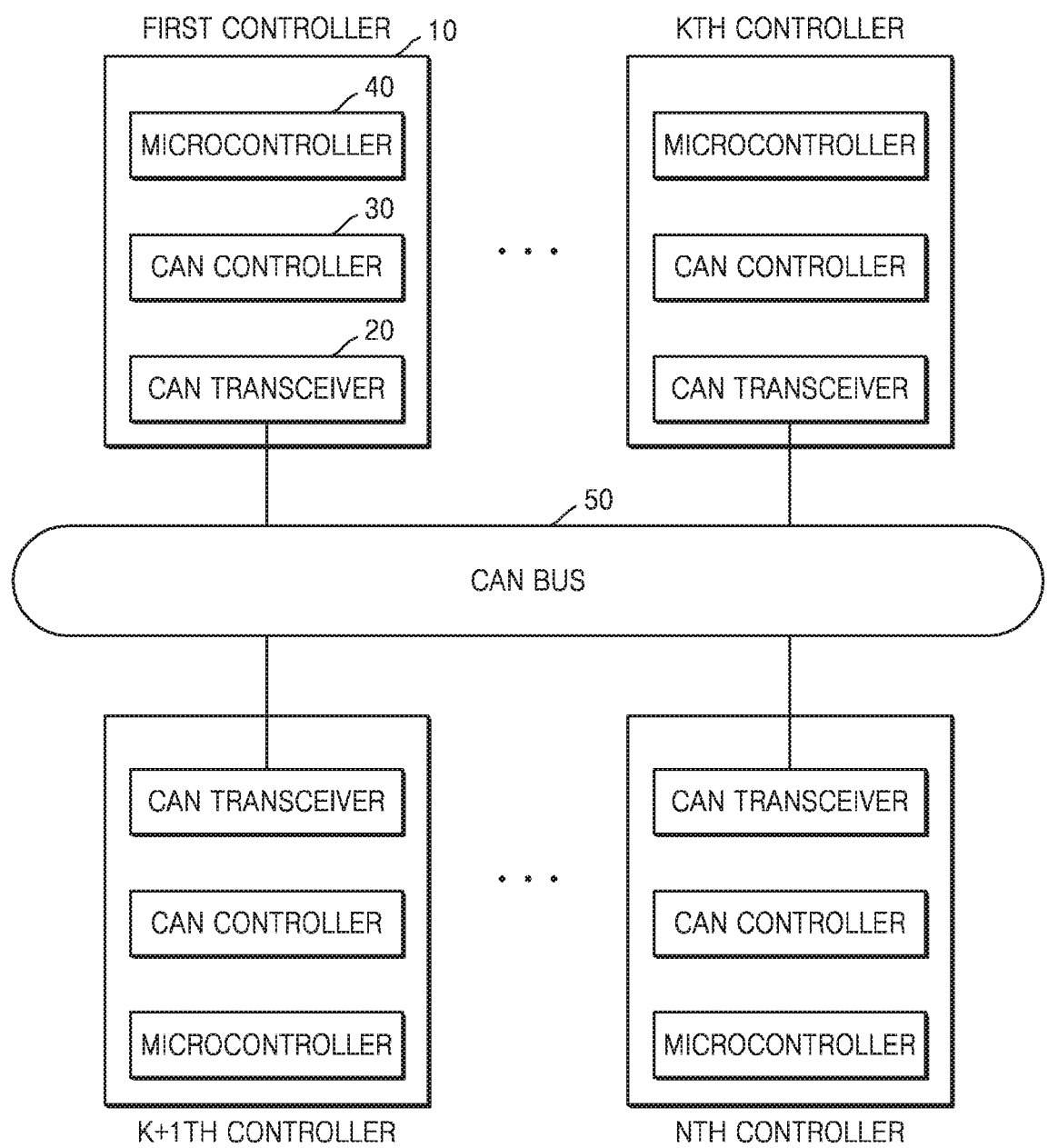
FIG. 1 is a block diagram of a configuration of an overall system for embodying the present disclosure.

Hereinafter, the present disclosure will be described in detail with reference to the drawings.

Also, in the description of the present disclosure, the same parts are denoted by the same reference numerals, and repetitive descriptions thereof will be omitted.

First, an example of a configuration of an overall system for embodying the present disclosure will be described with reference to FIG. 1.

As shown in FIG. 1, the overall system for embodying the present disclosure includes a CAN bus 50 for data transmission and reception and a plurality of controllers 10 connected to the CAN bus 50 as a configuration of a CAN network.

The CAN bus 50 is a communication line for data transmission, and preferably includes a twisted pair wire. At this time, two lines constituting the twisted pair wire are driven by different signals CAN_H and CAN_L. A transmission speed on the CAN bus 50 may vary depending on a length of the CAN bus 50.

Further, the CAN bus 50 is divided into a transmission line Tx and a reception line Rx. Each controller 10 transmits a message to the transmission line Tx and receives a message from the reception line Rx. In particular, all the controllers 10 are connected to the common transmission/reception lines Tx and Rx of the CAN bus 50 to transmit and receive messages.

The plurality of controllers 10 (electronic control units, ECU) or the first to Nth controllers 10 may be connected to the CAN bus 50 via a predetermined CAN connector. The maximum number of controllers that may be connected to one CAN network is theoretically 2032.

The controllers (ECUs) 10 may be divided into controllers that are connected to an external communication network such as a smart phone, the Internet, and a traffic information system and directly exposed to a security risk, and relatively safe controllers that have no direct connection to the external communication network.

The former controllers 10 are multimedia CAN and are controllers related to telematics, navigation, and the like. These controllers are connected to the external communication network such as a smart phone, the Internet, and a traffic information system to perform data communication. Thus, these controllers 10 are controllers accessible from an external terminal or a system.

On the other hand, the latter controllers 10 are mainly conventional typical controllers and are controllers for controlling an in-vehicle system, for example, controllers related to a power train such as an engine, transmission, etc.; controllers related to a chassis such as a braking device, a steering device, an airbag, etc.; and controllers related to a body such as a cluster, a door, a window, etc. These are usually referred to as P-CAN, C-CAN, and B-CAN, etc.

Meanwhile, each controller 10 includes a CAN transceiver 20, a CAN controller 30, and a microcontroller (CPU) 40.

The CAN transceiver 20 is connected to the CAN bus 50 via the predetermined CAN connector and constitutes a physical layer of a controller. The CAN transceiver 20 may provide functions of sensing and managing a failure of the CAN bus 50 and transmitting and receiving messages.

The CAN controller 30 transmits and receives a CAN protocol message and performs a message filtering function on the received message. Also, the CAN controller 30 provides a message buffer for retransmission control and an interface function with the microcontroller 40.

The microcontroller 40 may be equipped with a CPU, may provide an upper layer protocol, and provide various applications.

Next, a configuration of the CAN controller 30 according to an embodiment of the present disclosure will be described in more detail with reference to FIG. 2.

Figure 2:
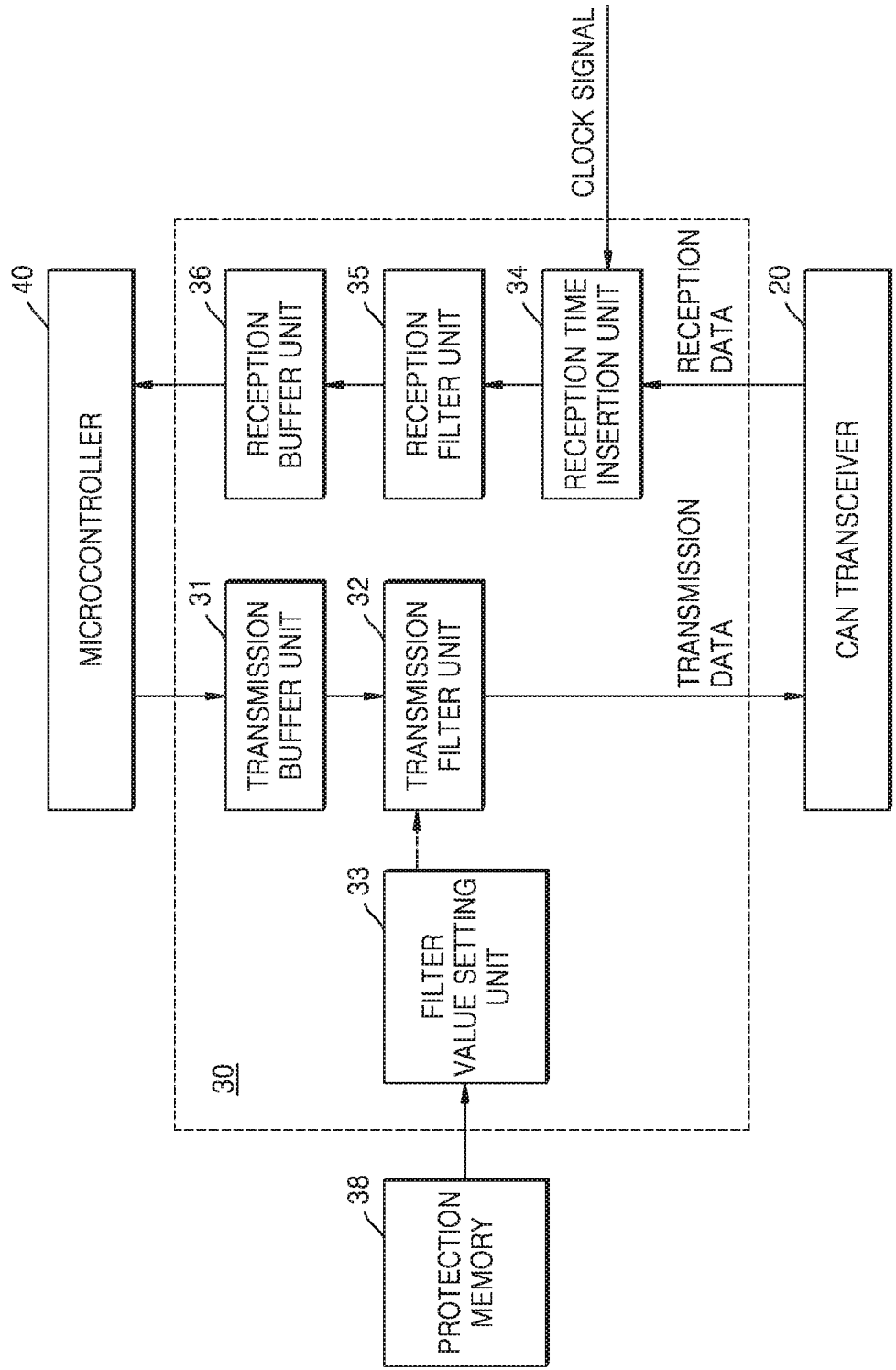
FIG. 2 is a block diagram of a configuration of a CAN controller according to an embodiment of the present disclosure.

As shown in FIG. 2, the CAN controller 30 according to the present disclosure includes a transmission buffer unit 31 for temporarily storing data to be transmitted, a transmission filter unit 32 for filtering transmission data, a filter value setting unit 33 for setting one or more filter values, a reception filter unit 35 for filtering reception data, and a reception buffer unit 36 for temporarily storing the reception data. Also, the CAN controller 30 further includes a reception time insertion unit 34 for inserting a reception time into the reception data or a protection memory 38 storing the filter value.

The transmission buffer unit 31 includes a buffer to temporarily store the data to be transmitted in the buffer. In particular, the microcontroller 40 stores the data (or transmission data) to be transmitted in the buffer of the transmission buffer unit 31.

Figure 3:
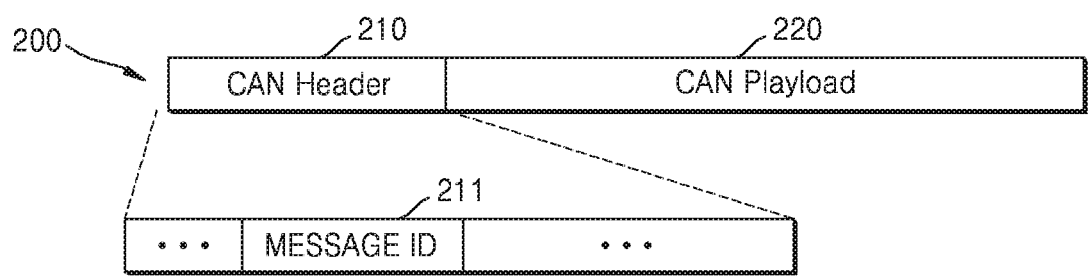
FIG. 3 is a diagram of a configuration of transmission and reception data of a CAN message according to an embodiment of the present disclosure.

As shown in FIG. 3, the transmission data includes a CAN header part 210 and a CAN payload part 220, which is a data frame part. The CAN payload 220 records information to be transmitted. For example, in the case of the controller 10 is an engine controller, data on a current state of an engine and the like are recorded in the CAN payload field 220. A standard of the above message conforms to a standard defined by a CAN protocol.

Also, in the CAN header part 210 of the transmission data, there is a message ID field 211. An ID of a corresponding message is recorded on the corresponding field. A message ID is an identifier of a message and indicates a kind of the message. For example, a message that transmits an RPM of the engine is periodically transmitted, where an RPM transmission message has the same message ID. That is, the controller 10 receiving the message determines which data the corresponding message has through the message ID.

The transmission buffer unit 31 sequentially stores the transmission data including the CAN header part 210 and the CAN payload part 220 in the buffer and stores the transmission data in the order received by the microcontroller 40, and then transmits the transmission data in the received order through the CAN transceiver 20.

Next, the transmission filter unit 32 filters the message ID 211 included in the transmission data to transmit only the transmission data having a message ID included in the filter value. That is, the transmission filter unit 32 has a white list of message IDs allowed to be transmitted and transmits only the transmission data having the message IDs in the white list.

That is, the transmission filter unit 32 performs filtering by comparing the message ID of the transmission data with the white list.

Next, the filter value setting unit 33 sets the filter value of the transmission filter unit 32, that is, the white list. Modes for setting the filter value include two modes, one is a protection function mode and the other is an administrator mode (or a test mode).

In the administrator mode, the filter value setting unit 33 sets the filter value or the white list according to a direct instruction from the microcontroller 40. That is, the filter value setting unit 33 receives an allowed message ID list (or the white list) from the microcontroller 40 and sets received message IDs as filter values of the transmission filter unit 32.

In the protection function mode, the filter value setting unit 33 fetches the message ID list or the white list stored in the protection memory 38 and sets the message ID list or the white list as the filter value of the transmission filter unit 32. Preferably, when the CAN controller 30 is powered on and initially starts (or is booted), the filter value setting unit 33 fetches the white list stored in the protection memory 38 and sets the white list as the filter value. Also, once the filter value is initially set, the filter value setting unit 33 does not change the filter value in the middle of driving by the instruction of the microcontroller 40 or the like.

Therefore, since the message ID list or the white list is fetched from the protection memory 38 to set the filter value only in an initial driving, the filter value is not changed even if the controller 10 is hacked by a malicious attacker in the middle of driving.

The filter value setting unit 33 also may set the filter value, that is, a white list, of the reception filter unit 35. The previous white list of the transmission filter unit 32 is referred to as a first white list and the white list of the reception filter unit 35 is referred to as a second white list. The second white list, like the first white list, has a list of message IDs that are allowed to be received.

The filter value setting unit 33 fetches the second white list from the protection memory 38 or the microcontroller 40 and sets the second white list to the filter value of the reception filter unit 35. Further, in the protection function mode, the filter value of the reception filter unit 35 is initially set once, and is not changed in the middle of driving.

The filter value setting unit 33 also sets a reception period for each message ID included in the second white list as a period of the filter value of the reception filter unit 35. The period set at this time is a period in which a message corresponding to each message ID is transmitted. Preferably, the period is initially set once and is not changed in the middle of driving.

Next, the protection memory 38 is a non-volatile memory such as read only memory (ROM) or flash memory, and stores the filter value or the message ID list.

The protection memory 38 is memory allowed to perform only a reading function with respect to the filter value setting unit 33. That is, the filter value setting unit 33 or the microcontroller 40 may not directly access the protection memory 38 to change or delete data.

Preferably, the protection memory 38 is configured as a normal non-volatile memory. A memory space of a part of the protection memory 38 may be designated as a protection area. In this case, only data stored in the memory of the protection area is allowed to be read, and data in an area other than the protection area may be changed or deleted.

The protection memory 38 or a protected memory area (the protection area) is not accessible using a memory address value as in the normal non-volatile memory (e.g. flash memory), and a special access method and a password are necessary for read/write access to the protected memory area.

The following information is stored in the protected memory or the protection area, that is, valid transmission message IDs, i.e., the first white list. That is, the message IDs included in the first white list are valid CAN IDs that may be transmitted to the CAN bus 50 in an electronic controller to which a "safe CAN controller (or a protection function mode)" is applied.

The second white list is also a set of valid CAN IDs that may be received from the CAN bus 50 by the controller 10 to which a "safe CAN controller (or a protection function mode)" is applied.

Also, preferably, period time information of each valid reception CAN ID is also recorded on the protection memory 38.

Next, the reception time insertion unit 34 inserts a reception time into data (or the reception data) received from the CAN transceiver 20. Preferably, a clock signal is inserted. That is, the reception time (the clock signal) of each received data is recorded.

Next, the reception filter unit 35 performs filtering on the message ID of the reception data and transmits only the allowed message ID to the reception buffer unit 36 to buffer the allowed message ID. Also, the reception filter unit 35 uses the period of the reception data to determine a message received in the period.

Specifically, the reception filter unit 35 filters the message ID 211 included in the received data such that only the reception data having the message ID included in the filter value is received. That is, the reception filter unit 35 has the second white list of the message IDs allowed to be received and receives only the reception data having the message IDs in the second white list. That is, the reception filter unit 35 performs filtering by comparing the message ID of the reception data with the second white list.

Also, the reception filter unit 35 records the reception time inserted in the reception data by each message ID. Preferably, all reception times of continuously received at least three data are recorded and differences between the recorded reception times and periods are compared to determine whether the data is malicious data. At this time, continuous three reception times are reception times of reception data having the same message ID.

Specifically, when a difference between a first reception time and a third reception time among the continuous three reception times is less than the period, at least one of the received at least three data is determined to be a malicious message.

Next, the reception buffer unit 36 stores the reception data in a reception buffer. Only the reception data filtered by the reception filter unit 35 is stored in the reception buffer. The reception data stored in the reception buffer unit 36 is fetched by the microcontroller 10.

Next, a method of setting one or more filter values according to an embodiment of the present disclosure will be described with reference to FIG. 4.

Figure 4:
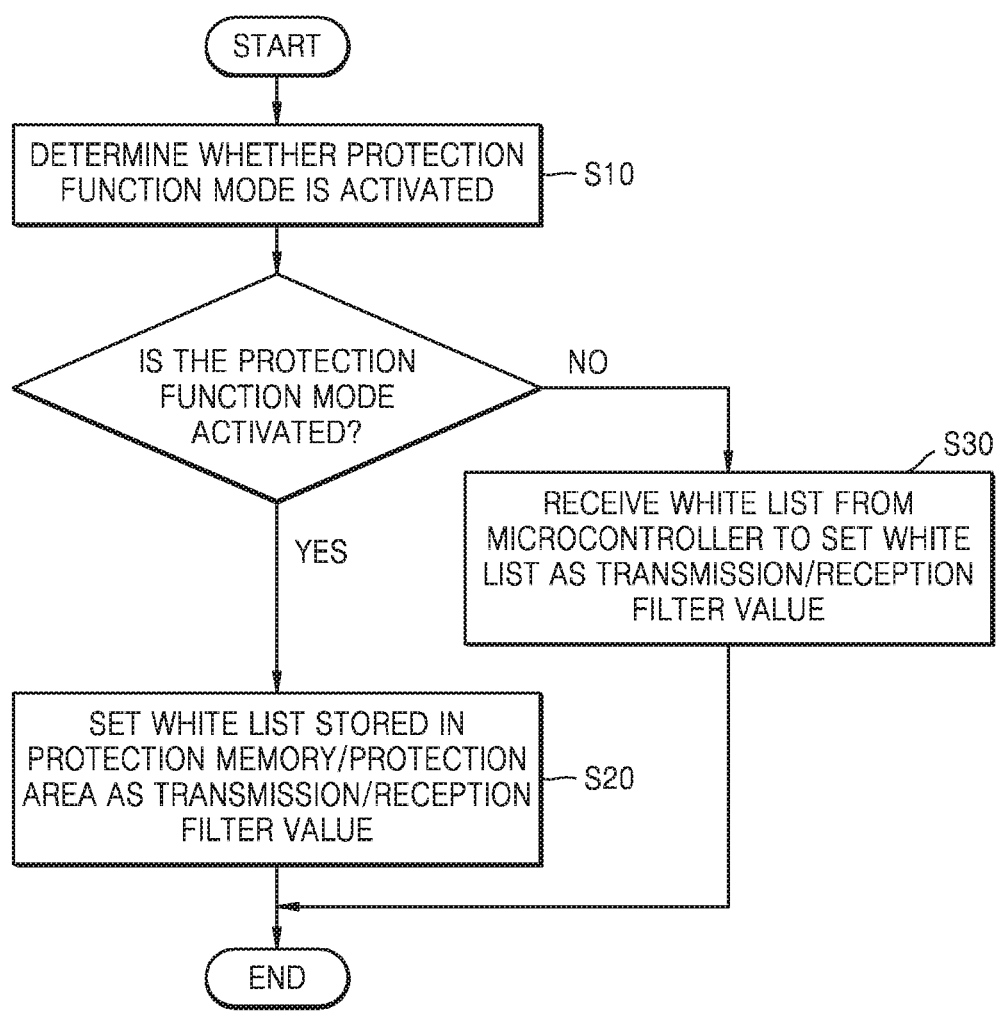
FIG. 4 is a flowchart for explaining a method of setting one or more filter values according to an embodiment of the present disclosure.

As shown in FIG. 4, first, the CAN controller 30 or the filter value setting unit 33 determines whether a protection function mode is activated (S10). Determination whether the protection function mode is activated is performed in an operation of initializing CAN communication.

In a state where the protection function mode is activated, a white list stored in the protection memory 38 or in a protection area of the protection memory 38 is fetched and set as a transmission filter value or a reception filter value (S20). The white list is a list of message IDs that are allowed to be transmitted or received. Preferably, the white list is divided into a transmission filter and a reception filter separately, and the transmission filter value and the reception filter value are set separately from each other.

If the protection function mode is not activated, the transmission filter value or the reception filter value may be set according to an instruction of the microcontroller 40, as an administrator mode or a test mode (S30). Specifically, one or more filter values is received through serial peripheral interface (SPI) communication according to the instruction of the microprocessor 40, and the transmission filter value or the reception filter value is set. Alternatively, as another example, the filter value (or the white list) is temporarily stored in a register (not shown) using a register provided in the controller 10, and the transmission filter value or the reception filter value is set as the value stored in the register.

Next, a detailed configuration of the transmission filter unit 32 according to an embodiment of the present disclosure will be described in more detail with reference to FIG. 5.

Figure 5:
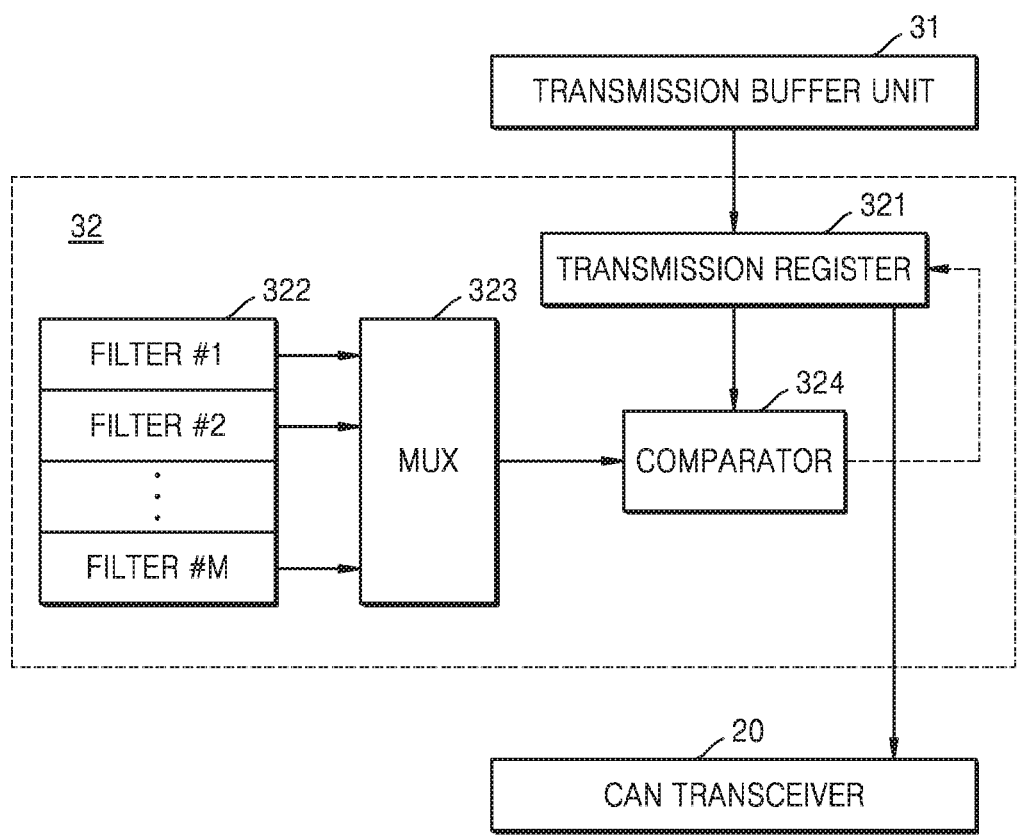
FIG. 5 is a block diagram of a detailed configuration of a transmission filter unit according to an embodiment of the present disclosure.

As shown in FIG. 5, the transmission filter unit 32 according to the present disclosure includes a transmission register 321 for temporarily storing transmission data, a transmission filter 322 on which a plurality of filters are recorded, a multiplexer Mux 323 for selecting and outputting one of the plurality of filters, and a comparator 324 for comparing a transmission filter value with the transmission register 321.

That is, the transmission register 321 temporarily stores transmission data fetched from the transmission buffer unit 31. Further, the transmission filter 322 stores a plurality of filter values or a white list. Only one filter value is selected by the multiplexer 323. The comparator 324 performs filtering by comparing a message ID and the filter value in the transmission data of the transmission register 321. A result of the comparator 324 controls the transmission register 321 to control the CAN transceiver 20 to transmit or block the transmission data.

In particular, the transmission filter 322 is previously set at the time of initialization, and the filter values are valid message IDs that may be transmitted. Therefore, only when at least the same result is obtained by the comparator 324, the transmission data of the transmission register 321 is transmitted to the CAN transceiver 20. Therefore, when a result that storing transmission data is the same as any filter value of the transmission filter 322 is not obtained, the transmission data is not transmitted to the CAN transceiver 20. That is, since storing transmission data has an invalid message ID, the corresponding transmission data is blocked.

Next, a detailed configuration of the reception filter unit 35 according to an embodiment of the present disclosure will be described in more detail with reference to FIG. 6.

Figure 6:
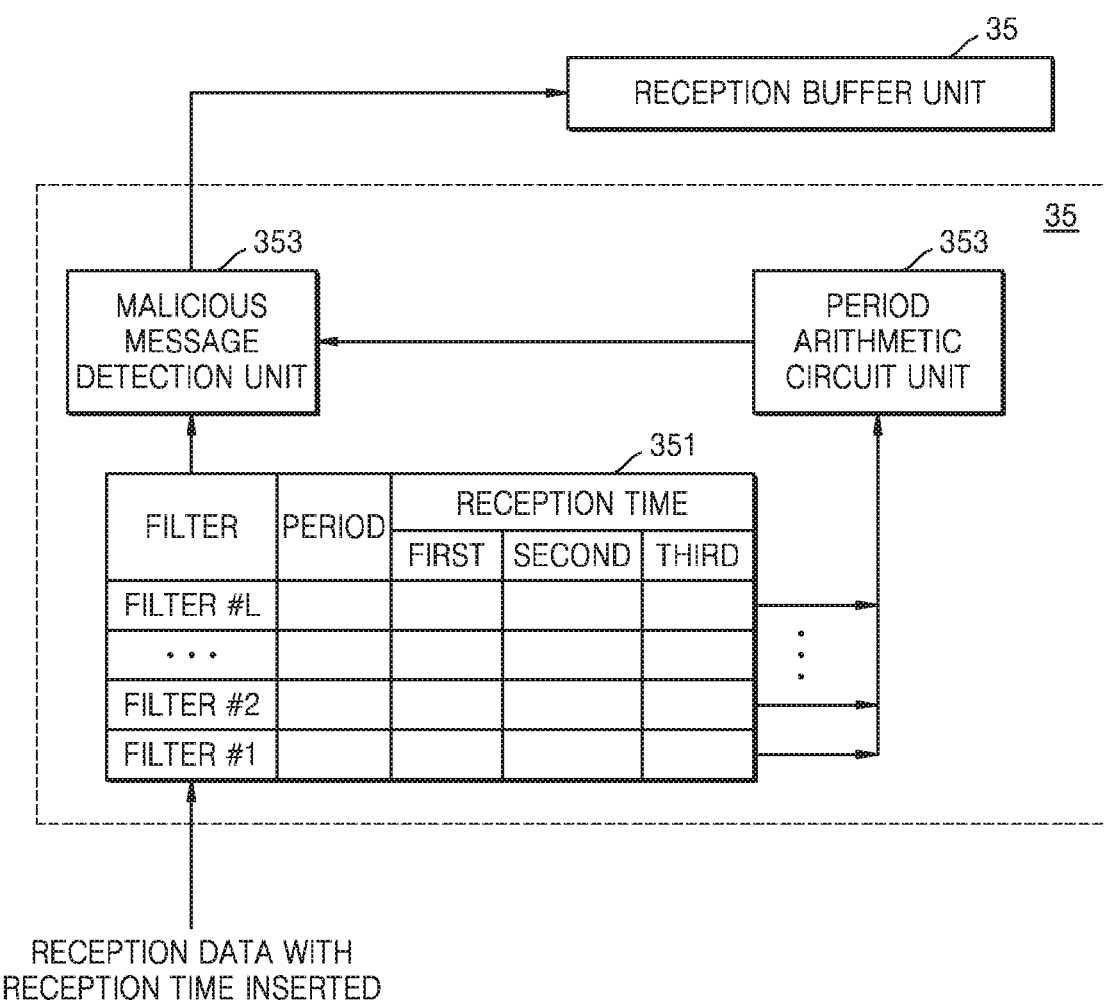
FIG. 6 is a block diagram of a detailed configuration of a reception filter unit according to an embodiment of the present disclosure.

As shown in FIG. 6, the reception filter unit 35 includes a reception filter 351 for recording a message ID allowed to be received and a period or a reception time, a period operation circuit unit 352 for comparing a difference in the reception time and the period, and a malicious message detection unit 353 for determining a malicious message using a reception filter and a result of a period operation.

Specifically, the reception filter 351 includes a storage space for recording the message ID, the period, and the reception time of a filter. Preferably, the reception filter 351 may include a two-dimensional register, a memory, a cache, or the like. That is, the reception filter 351 includes a table in which the filter, the period, and the reception time for the message ID are configured as fields.

At this time, the reception time has at least three fields. Each field stores the reception time. Preferably, the fields of the reception time include at least three shift registers such that a stored value is shifted forward whenever reception data of the message ID is received. That is, a first reception time that is received last is discarded, a second reception time is shifted to a first shift register, and third data is shifted to a second shift register. A last shift register stores the most recent reception time.

Next, the period operation circuit unit 352 is a circuit for comparing differences between the period recorded in the reception filter 351 and at least three reception times, and outputting resultant values. Preferably, the period operation circuit unit 352 calculates a difference between the first reception time and a third reception time, compares whether the calculated reception time difference is less than the period and outputs a result. On the other hand, the period operation circuit unit 352 includes a subtractor for calculating a difference in the reception time, a time difference, a difference in the period, and the like.

Next, the malicious message detection unit 353 extracts a message ID of the reception data and searches whether the extracted message ID is present in the reception filter 351. The malicious message detection unit 353 blocks the reception data when the extracted message ID is not present in the reception filter.

Also, when the extracted message ID is present in the reception filter 351, the malicious message detection unit 353 controls the period operation circuit unit 352 to perform the period operation based on the period and the reception time among the filter value of the message ID.

The malicious message detection unit 353 also transmits the reception data to the reception buffer unit 36 or blocks according to an operation result of the period operation circuit unit 352. That is, when the operation result of the period operation circuit unit 352 is smaller than the period, the malicious message detection unit 353 blocks the reception data. When the result is not smaller than the period, the malicious message detection unit 353 transmits the reception data to the reception buffer unit 36.

Next, a method of filtering reception data according to an embodiment of the present disclosure will be described in more detail with reference to FIG. 7.

Figure 7:
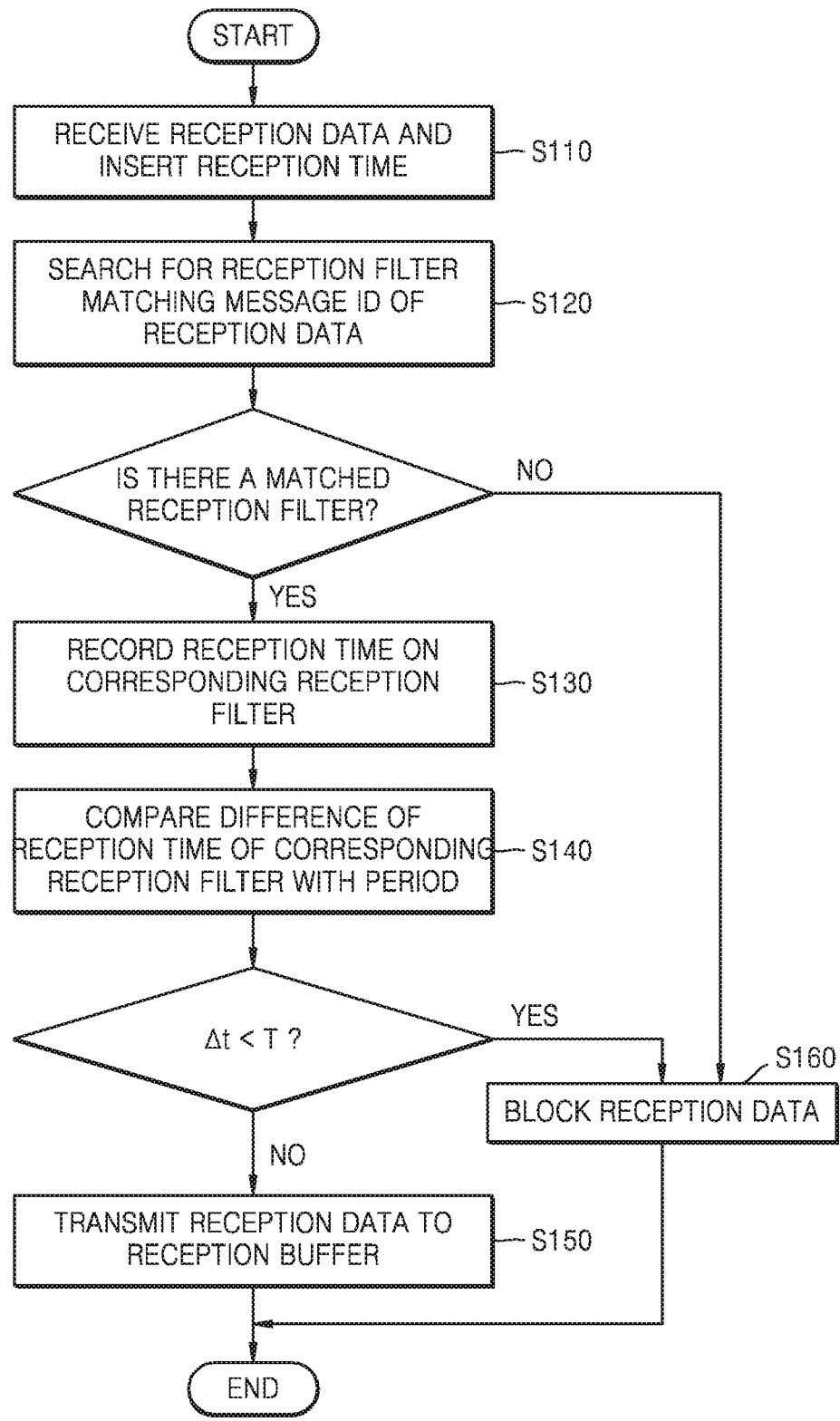
FIG. 7 is a flowchart for explaining a method of filtering reception data according to an embodiment of the present disclosure.

As shown in FIG. 7, when the CAN controller 30 receives the reception data, the CAN controller 30 adds and inserts a reception time or a clock signal to and into the reception data and inserts the received data (S110).

Next, the CAN controller 30 extracts a message ID from the reception data, and searches for one or more filter values matching a reception filter (S120). The message ID is data stored in a CAN header of the reception data and is information about an identifier of a message. That is, the message ID is extracted from the CAN header 210 of reception data 200. Then, a filter matching the extracted message ID is searched.

Next, when the matching filter value is not present in the reception filter, the reception data is blocked (S160). That is, the reception filter is a white list of message IDs that are allowed to be received. Therefore, when the message ID is not present in the white list, the reception data is not an allowed message. Therefore, the reception data is blocked.

If the matching filter value is present in the reception filter, a reception time is recorded on the reception filter (S130). At this time, a reception time shift register of the reception filter is shifted such that the oldest reception time is discarded, and a current reception time is recorded as the most recent reception time.

Next, a difference of the reception time of the reception filter of the message ID is calculated, and the calculated time difference is compared with a period (S140). Preferably, a difference between a first reception time and a third reception time is obtained, and the obtained difference is compared with the period.

If the time difference is smaller than the period, the reception data is blocked (S160). According to a CAN communication protocol, a controller is required to transmit data at least once within the minimum period time when transmitting the data. Therefore, a time interval between the third reception time and the first reception time must be longer than a period time. When the difference between the first reception time and the third reception time is smaller than the period, it may be considered that a malicious message is interrupted. That is, at least one of first, second, and third messages may be a malicious message.

Accordingly, the CAN controller 30 determines that the malicious message is received, blocks received data, or warns that the malicious message is detected.

Next, when the difference in the reception time is greater than the period, the reception data is transmitted to a reception buffer (S150).

As described above, the embodiments made by the present inventor have been described, but the present disclosure is not limited to the embodiments. It should be understood that various changes may be made within the scope of the present disclosure.

We claim:

1. A controller area network (CAN) controller safe against a CAN-communication-based hacking attack comprising:
a transmission buffer unit temporarily storing transmission data to be transmitted to a CAN bus;
a transmission filter unit having message identifiers (IDs) allowed to be transmitted as a transmission filter, configured to search for a message identifier (ID) of the transmission data in the transmission filter, and filter the transmission data;

a protection memory storing one or more filter values of the transmission filter; and a filter value setting unit configured to fetch the filter value stored in the protection memory to set the one or more filter values of the transmission filter of the transmission filter unit, wherein the filter value setting unit is set to a protection mode and a test mode, the filter value of the transmission filter is set as one or more filter values stored in the protection memory in the protection mode, and the one or more filter values of the transmission filter is set by the CAN controller of a controller or a microcontroller in the test mode.

2. The CAN controller safe against the CAN-communication-based hacking attack of claim 1, wherein the protection memory or a protection area of the protection memory does not change or delete one or more filter values stored by the CAN controller of a controller or a microcontroller.

3. The CAN controller safe against the CAN-communication-based hacking attack of claim 1, wherein the protection memory is read only memory (ROM) or a non-volatile memory of a flash memory.

4. A controller area network (CAN) controller safe against a CAN-communication-based hacking attack comprising:

a transmission buffer unit temporarily storing transmission data to be transmitted to a CAN bus;

a transmission filter unit having message identifiers (IDs) allowed to be transmitted as a transmission filter, configured to search for a message identifier (ID) of the transmission data in the transmission filter, and filter the transmission data;

a reception filter unit having message IDs allowed to be received as a reception filter, configured to search for a message ID of reception data received by the CAN bus in the reception filter, and filter the reception data;

a protection memory storing one or more filter values of the transmission filter and one or more filter values of the reception filter; and a filter value setting unit configured to fetch the filter value stored in the protection memory to set the one or more filter values of the transmission filter of the transmission filter unit or the one or more filter values of the reception filter, wherein the filter value setting unit is set to a protection mode and a test mode, the filter value of the transmission filter is set as one or more filter values stored in the protection memory in the protection mode, and the one or more filter values of the transmission filter is set by the CAN controller of a controller or a microcontroller in the test mode.

5. The CAN controller safe against the CAN-communication-based hacking attack of claim 4, wherein the protection memory or a protection area of the protection memory does not change or delete one or more filter values stored by the CAN controller of a controller or a microcontroller.

6. The CAN controller safe against the CAN-communication-based hacking attack of claim 4, wherein the protection memory is read only memory (ROM) or a non-volatile memory of a flash memory.

7. The CAN controller safe against the CAN-communication-based hacking attack of claim 4, further comprising a reception time inserter configured to insert a reception time into the reception data, wherein the reception filter unit is configured to determine whether the reception data is malicious by comparing a difference of reception times of most recently received at least three reception data having the same message ID with a period of the corresponding message ID.

8. The CAN controller safe against the CAN-communication-based hacking attack of claim 7, wherein, when a difference between a first reception time and a third reception time among the most recently received at least three reception data is smaller than the period of the corresponding message ID, the reception filter unit is configured to determine at least one reception data of the at least three reception data as a malicious message.

* * * * *